United States Patent [19]

Brandt

[11] Patent Number: 4,660,033
[45] Date of Patent: Apr. 21, 1987

[54] ANIMATION SYSTEM FOR WALK-AROUND COSTUMES

[76] Inventor: Gordon C. Brandt, 1595 Noe St., Suite 11, San Francisco, Calif. 94131-2365

[21] Appl. No.: 760,001

[22] Filed: Jul. 29, 1985

[51] Int. Cl.[4] .................. A63H 5/00; H04Q 7/00; H01H 5/20
[52] U.S. Cl. .................. 340/825.72; 446/299; 446/301; 200/5 A; 200/67 DB; 2/69; 340/365 R
[58] Field of Search .............. 340/825.72, 365 R, 86; 2/69; 200/5 A, DIG. 2, DIG. 34, 67 A, 67 D, 67 DB; 446/363, 339, 327, 298-302

[56] References Cited

U.S. PATENT DOCUMENTS

| | | | |
|---|---|---|---|
| 3,022,878 | 2/1962 | Seibel et al. | 340/365 R |
| 3,166,856 | 1/1965 | Uttal | 340/365 R |
| 4,414,537 | 11/1983 | Grimes | 340/365 R |

FOREIGN PATENT DOCUMENTS

686465  3/1965  Italy ........................ 340/86

*Primary Examiner*—Donald J. Yusko
*Attorney, Agent, or Firm*—Cislo & Thomas

[57] ABSTRACT

A complete system for animating external features of a full size walk-around costume designed for the entertainment industry is disclosed. The animation system comprises two major parts: the costume itself and the programming/playback system. The complete system is lightweight and portable and gives complete freedom of motion to a person inside a walk-around costume. The costume is made to simulate life by the inclusion of motors or other devices which move the eyes, the eyelids, eyebrows, the ears, the nose, and the mouth. The mouth movement is controlled by a radio signal which may be synchronized with a prerecorded audio track. To give maximum spontaneity to expression and to reduce the time required to program costume movements, all other external features are controlled by the dancer inside the costume, using newly developed pressure sensitive finger switches which are activated by bending a finger.

17 Claims, 10 Drawing Figures

ANIMATION SYSTEM FOR WALK-AROUND COSTUMES

BACKGROUND OF THE INVENTION

This invention relates to a complete system for animating external features of a full size walk-around costume designed for the entertainment industry. In particular, this invention relates to an animation system comprising the costume itself and a programming/playback system.

Full-size walk-around costumes, featuring a actor or dancer insider a styled suit, have been in use for many years. Such costumes are seen in amusement parks, stage shows, and parades. The most primitive walk-around costumes have cloth or painted exteriors which do not change or move and therefore cannot give changing expression to a character's face.

OBJECTS AND SUMMARY OF THE INVENTION

Accordingly, it is an object of the invention to provide a walk-around costume in which the expression of the character's face may be changed.

It is another object of the invention to provide a walk-around costume apparatus which is lightweight and portable and gives complete freedom of motion to the person inside the walk-around costume.

It is yet another object of the invention to provide a walk-around costume which can simulate life by the inclusion of motors or other devices which move the eyes, the eyelids, the eyebrows, the ears, the nose, and the mouth.

It is still a further object of the invention to provide a walk-around costume apparatus in which external features are controlled by the dancer inside the costume by pressure-sensitive finger switches.

These and further objects of the invention will become apparent upon consideration of the following commentary taken in conjunction with the drawing.

In accordance with the invention, a full size walk-around costume apparatus comprising a costume and a programming/playback system is provided. The programming/playback system includes means for generating a tone, means for controlling the amplitude of the tone, means for converting several tones into a series of pulses to form a pulse chain in which individual pulses correspond to the amplitude of individual tones, means for modulating a carrier signal with the pulse chain and means for transmitting the modulated pulse chain. The costume includes a movable mouth, means for receiving the transmitted, modulated pulse chain, means for converting the modulated pulse chain into an electrical pulse, and means for controlling the position of the mouth in response to the electrical pulse.

The two main components of the walk-around costume system are the costume and the programming/playback system. The programming/playback system comprises a multitrack tape recorder, a multichannel programming tone generator, and a multichannel radio transmitter. The costume is a walk-around costume, adapted to be worn by an actor or dancer. The main components of the costume are as follows: sculpted head and face; the mechanical actuators and linkages which move parts of the head and face; a control box which contains a radio receiver, mouth demultiplexer, a plurality of servo drivers, and other circuitry; a rechargeable battery pack; a vest which contains the battery pack and control box; and finger switch assemblies.

Operation of programming/playback system

The programming/playback system may be operated in either of two modes: program mode or playback mode. In the program mode, the movements of the character's mouth are programmed to move in synchrony with a pre-recorded audio track. One of a plurality of joysticks is assigned to the character to be programmed. The joystick controls the amplitude of a tone to be recorded onto one track of the multitrack tape recorder. Each character is assigned one track of the multitrack tape recorder. The position of the character's mouth is determined by the amplitude of a tone recorded on that character's track. The convention commonly used is that no tone corresponds to "mouth shut", and a 0 VU tone corresponds to "mouth open". Once the joystick is assigned to a particular tape track, the amplitude of the tone recorded on that track is controlled by the position of the joystick in the programmer's hand. The tone is also sent to one particular channel of a multichannel transmitter.

The multichannel transmitter is a device which accepts a tone input and converts that tone into a pulse whose duration corresponds to the amplitude of the input tone. The pulses corresponding to a plurality of tone inputs are formed into a "pulse chain" by having the pulse associated with the first tone input followed, after a short delay, by the pulse for the second tone input, and so forth for the number of tone inputs. After the "pulse chain" comes one sync pulse whose length is so much longer than any of the pulses which correspond to the input tones that the sync pulse is easily differentiated from the other pulses. The transmitter then takes this series of pulses, the "pulse chain" plus the sync pulse, and modulates an RF (radio frequency) carrier with AM, FM or PCM. The modulated RF is applied to an antenna, and is thus broadcast to the costume. The purpose of the transmitter is, in short, to take an input tone and broadcast a signal in the form of an variable-width pulse to the costume. The width of a pulse controls the position of the character's mouth. Several walk-around costumes may be substantially simultaneously controlled in this fashion, with each pulse in the pulse chain selectively adapted to be received by, and thus control the mouth of, a separate costume.

Inside the costume, the dancer wears a vest which contains a rechargeable battery pack and a control box. The control box contains a variety of circuitry, some of which forms a radio receiver which converts the broadcast "pulse chain" from radio back into more easily used electrical pulses. The control box also has circuitry, refered to later as the "mouth demultiplexer", which selects the one pulse of the "pulse chain" which corresponds to a particular character's mouth position. This pulse is then sent to the servo motors in the preferred embodiment which control the position of the mouth.

The transmission of the pulses to the costume during programming is essential for observation of a character's reaction to the programmer's commands. Only by close observation during programming can the programmer determine that the mouth movements are realistic. Control of mouth position by joystick gives the programmer freedom to exaggerate mouth movement, open the character's mouth in response to surprise, or to move it less if a character is whispering.

Previous attempts at controlling a mouth using the character's actual audio track would not allow such control over mouth response.

Operation during playback mode

During playback, the multitrack tape recorder plays both the pre-recorded audio track and the character's tone track for each character. Each tone track is fed into one channel of the multichannel transmitter for conversion to a pulse width and broadcast to the costumes. This pulse, when received by the control box which the dancer wears, controls the position of the character's mouth.

The dancer gives motion to the legs, arms, torso, neck, and head of the costume. The mouth and face of the costume feature movements controlled by electric servo motors in their preferred embodiment. The servo motors are connected by mechanical linkages to exterior parts of the costume, typically fiberglass or metal covered with cloth or fur or paint. As described above, the dancer wears a vest which contains a control box. During playback, the dancer also wears "switch glove" assemblies in which flexible switches are worn on the inside of each finger. The flexible switches are very thin (less than 1/16 inch) and comprise two parallel pieces of copper separated by fiberglass insulators placed at each end. The switches are normally open, but will close (make contact) either by being bent or by having pressure applied to the middle of the switches. The angle of bending at which the switch makes contact may be varied during manufacture. Similarly, the amount of pressure required to bend the switch may be varied during manufacture. The result is a glove with up to one switch per finger, which the dancer may operate by bendin his or her finger, or by pressing against the switch with another finger, or by pressing the finger and switch into some object (such as a prop) held in the hand.

The switch glove assemblies are connected to the control box. The switches are connected to circuitry referred to as "servo drivers." Each control box has a plurality of servo drivers. The servo drivers take their inputs from the switch gloves and from a group of potentiometers. The potentiometers are set to a voltage which corresponds to a certain position of a character feature. Examples of potentiometer settings and use would be a group of three potentiometers which were assigned to "eyeball upper limit", "eyeball middle position", and "eyeball lower limit". Two switches of a switch glove might represent "eyes up", and "eyes down". The servo driver would select the corresponding potentiometer and route that voltage to a voltage to pulse width converter similar to that used in the multichannel transmitter. This pulse, whose width varies according to which switch or combination of switches is closed, is then routed as a control signal to one servo on the character's head. In the present configuration, a control box may include up to eight switch inputs and six servo drivers.

DETAILED DESCRIPTION OF THE PREFERRED EMBODIMENTS

General System Description

Figure 1:
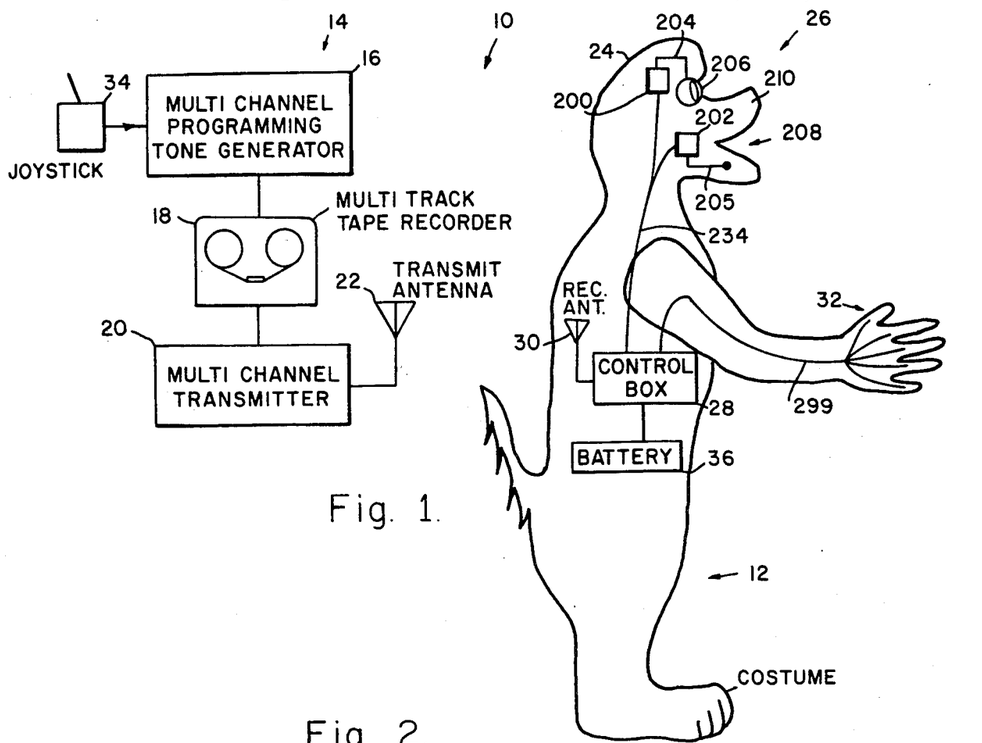
FIG. 1 is a block diagram of the walk-around costume of the invention including the programming/playback system and costume.

Referring now to the drawing, wherein like numerals of reference designate like elements throughout, a diagram of the walk-around system according to this invention is illustrated generally at 10 in FIG. 1. The walk-around costume system 10 of the invention comprises a costume 12 and a programming/playback system 14. The programming/playback system 14 includes means 16 for generating a tone, means 18 for storing signals and means 20 for transmitting a signal via an antenna 22. The costume 12 includes a sculpted head 24 and face 26, means 28 for receiving and processing a signal via antenna 20, means, more fully described below, for moving parts of the head and face in response to both the processed signal, and separate switch means 32 operated by the fingers of the costume wearer. This invention operates in two principal modes, referred to as "programming" mode and "playback" mode.

The programming mode is used to generate and record tones which cause the mouth 208 of one of a plurality of characters 12 to move in synchrony with a prerecorded audio soundtrack. The mouth 208 of the costume 12 will respond during the programming, so the programmer may watch the effect of the programming. In addition, the character's mouth will respond every time the multitrack audio tape 114 is played. Since the prerecorded audio track, which contains voices and music, is a part of the same tape 114 on which programming signals are recorded, the process of programming ensures that the movements of a character's mouth 208 will remain in sync with the spoken words.

Figure 4:
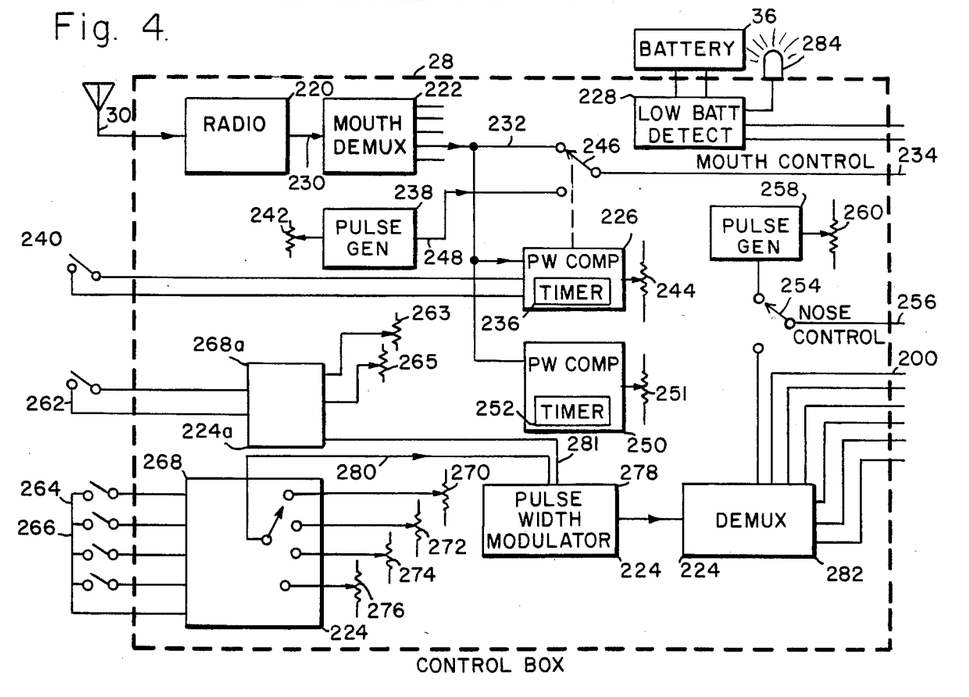
FIG. 4 is a block diagram of the control box found in the costume.

The playback mode involves the playing of the multitrack audio tape 114. One channel contains the prerecorded audio track of voices and music. One of a plurality of other tracks is assigned to a character, with each character assigned a separate track. Other channels may be assigned to other characters, thus enabling control of a plurality of characters. On each character's track, a tone is recorded, the amplitude of which corresponds to the mouth position of that character. The tones from each character's track are fed into the multichannel transmitter 20 which broadcasts a pulse chain 312 of radio pulses to each character. Each costume contains a control box 28 which includes a radio receiver 220 and a mouth demultiplexer 222 which selects the one pulse of the pulse chain which is intended for that particular character. The control box 28 then may route the mouth position pulse through switch 246 to a servo motor 202 located in the costume head 24 near the mouth mechanism 208. During playback, the dancer inside the costume wears switch glove assemblies 32 which allow him or her to control features on the costume's face. Such features include, but are not limited to, the eyebrows, the eyeballs 206 (both up/down and left/right), the eyelids, the nose 210, and the ears. The mouth 208 may also be controlled by the switch glove assembly 32.

Joysticks and Multichannel Programming Tone Generator

Figure 2:
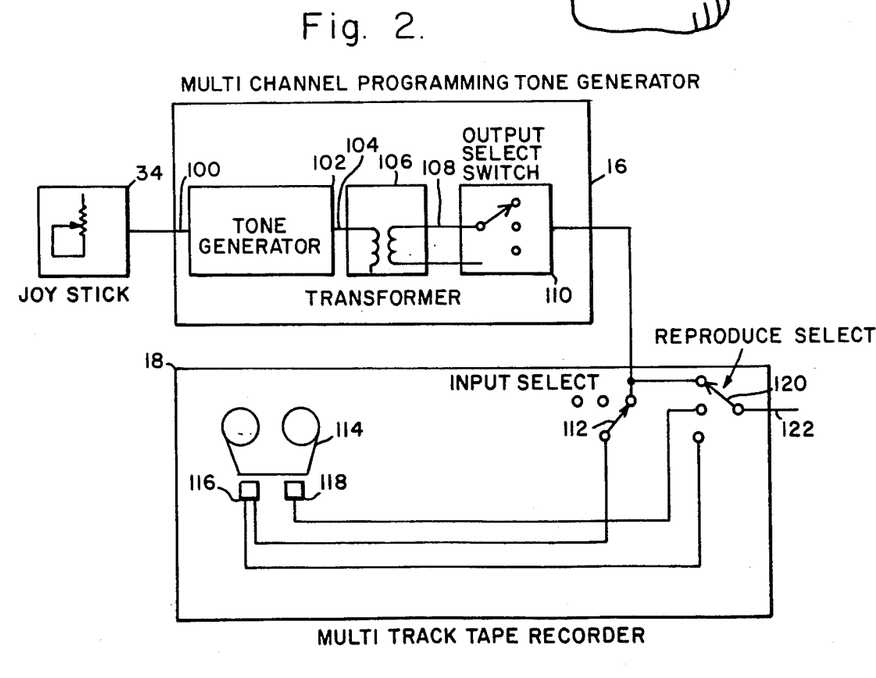
FIG. 2 is a block diagram of the multichannel programming tone generator and multitrack tape recorder portion of programming/playback system.

One or more joysticks 34 and a multichannel programming tone generator 16 make up that portion of the programming system which generates tones used to represent the position of a character's mouth 208. The convention commonly used is that no tone output from the multichannel programming tone generator 16 corresponds to the character's mouth in a fully shut position. A tone of 0 Volume Units (as read on a VU meter on the multitrack tape recorder 18 or on the multichannel transmitter 20) corresponds to the character's mouth 208 being fully open. The tone can be recorded at any level between these extremes, and so the mouth may assume any position between fully closed and fully open, inclusive. The position of the mouth 208 is assumed to be linearly proportional to the amplitude of tone produced by the multichannel programming tone generator 16. On other words, a tone of half maximum amplitude corresponds to the character's mouth 208 being half open. Similarly, a tone at one quarter maximum amplitude corresponds to the character's mouth 208 being one-quarter open.

The joystick 34 is a device used by the programmer to control the amplitude of the programming tones. When moved to one end of its travel, the joystick causes no tone to be output from the tone generator 102. At the other end of the joystick's travel, the tone generator 102 will output its maximum signal. The joystick 34, a form of potentiometer, is connected by conductor 100 to the tone generator 102. The output of the tone generator 102 is connected to the input of transformer 106 via connector 104. The output of the transformer 106 is applied to the output selector switch 110 via connector 108. The output selector selects one of the inputs of the multichannel tape recorder 18.

One track of the multitrack tape recorder 18 is assigned to the tone signal for each character's mouth 208. During programming, the programmer sets the output selector switch 110 to the channel corresponding to the particular character whose mouth movement is being programmed.

In FIG. 2, only one channel of the multichannel programming tone generator 16 is shown. As many joysticks as desired may be used simultaneously. Since most commonly one person does the programming, two joysticks 34 (one for each hand) are usually used.

During programming, the joystick 34 is moved to simulate the character's mouth motion. The programmer controls the rate at which the mouth opens and closes, how far the mouth opens, and when the mouth opens and closes. The joystock 34 thus gives the programmer full control over the response of the character's mouth 208. Earlier systems which relied on the prerecorded audio track to control the mouth position were incapable of modifying the response of the mouth 208 to that audio track. With the present system, the programmer has much greater range of response to the audio track. The mouth 208 may be programmed to open when there is no audio present to indicate surprise or alarm. The mouth 208 may briefly be left open after a word is spoken for emphasis.

Multitrack Tape Recorder

The multitrack tape recorder 18, shown in FIG. 2, is of a type commonly available. It is capable of recording and playing up to 24 tracks simultaneously. An input selector switch 112 on each track selects from a variety of sources one input which will be recorded on that track. Again for clarity, the multitrack tape recorder 18 is shown having only one channel.

During programming, the programmer listens to the prerecorded audio track, which is one track of multitrack tape 114. This track contains music and the voices of the various characters. The programmer has the choice of listening to the voices from the record/selrep head 116 or from the playback head 118. These two heads are separated by several inches of tape. Recording takes place only on the record/selrep head 116. In order for the programmed mouth movements to properly synchronize with the prerecorded audio track, the tones for controlling the characters' mouth positions must be recorded at the same point on the tape that is currently playing. Therefore, during programming, the prerecorded audio track is played using the same head 116 which will be used to record the programming tones. During playback, the playback head 118 is used for replay of both prerecorded audio track and programming tones. The reproduce select switch 120 determines which tape head, 116 or 118, will be the source of the playback signal.

Figure 3:
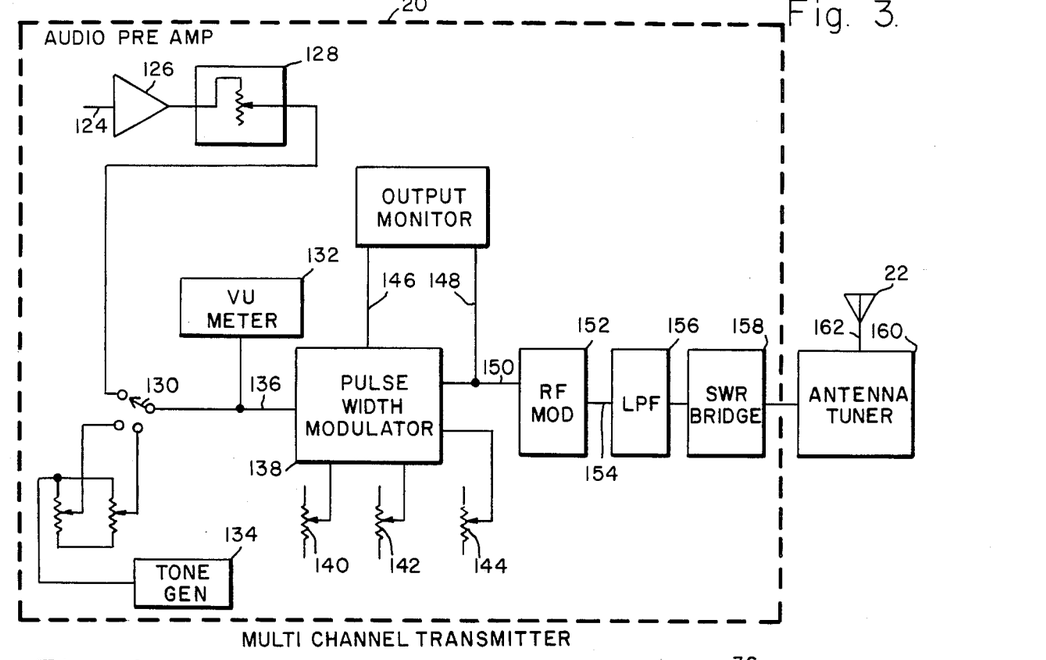
FIG. 3 is a block diagram of the multichannel transmitter portion of the programming/playback system.

Each of the multichannel tape recorder's outputs are routed by a conductor 122 to an input 124 of the multichannel transmitter 20.

Multichannel Transmitter

FIG. 3 shows only one channel of a multichannel transmitter 20. The purpose of the multichannel transmitter 20 is to convert an input tone into a radio pulse of varying width.

The input signal is brought by conductor 122 to the input 124 of one channel of the multichannel transmitter. The input signal is commonly a single frequency tone of varying amplitude. In the context of this invention, the amplitude of the tone represents the positin of an animated character's mouth 208. The input signal first encounters an audio preamp 126 with variable gain 128. The variable gain device 128 is a slide potentiometer similar to those found on an audio mixing console. The purpose of the variable gain is to compensate for any fluctuation in the input signal level. The level of input signal is observed on the VU meter 132 for the particular channel. After the variable gain preamplifier 126, 128, the input signal is routed to an input select switch 130. The purpose of this switch is to allow the transmitter operator to select either the input tone signal from the multitrack tape recorder or to select one of number of fixed input levels from a tone generator 134. Such fixed input levels are commonly set so that when they are selected they cause the mouth 208 to be full open or one-half open. For example, selecting the fixed input level for full open might be appropriate between takes of a television show so that the dancer inside the costume may more easily breathe.

Whether the input tone or one of the fixed input levels is selected, the value of the input signal is displayed on that channel's VU meter 132. The output of the input select switch 130 is brought to that channel's input on the pulse width modulator (PWM) 138. The PWM accepts up to seven input signals in the preferred embodiment. As shown in FIG. 3, conductor 136 carries the signal from input 124 to the PWM 138. For clarity, the other six channel inputs, audio preamps with variable gain, input select switches and VU meters are not shown in FIG. 3.

Each input signal is converted into a pulse whose width is linearly proportional to the amplitude of the input signal. The minimum pulse width for each channel is set by a potentiometer 140. This minimum pulse width corresponds to the condition of no input signal applied on conductor 136 to the PWM 138. The maximum pulse width for each channel is set by a potentiometer 142. This maximum pulse corresponds to the case when a maximum amplitude (0 VU on the VU meter) signal is applied on conductor 136 to the input of this channel of the PWM 138. Again, only one channel's minimum/maximum pulse width potentiometers 140, 142 are shown. It will be appreciated that each channel of the PWM 138 of the multichannel transmitter 24 has this feature.

The PWM 138 converts the input signal on conductor 136 to a pulse width whose maximum and minimum values are set by potentiometers 140, 142. Between these maximum and minimum values, the pulse width varies linearly with increasing input signal amplitude. In other words, if the amplitude on input 136 is one-half maximum, then the pulse width will be halfway between the minimum and maximum values set by potentiometers 140, 142.

Figures 5, 6, 7, 8, 9, 10:
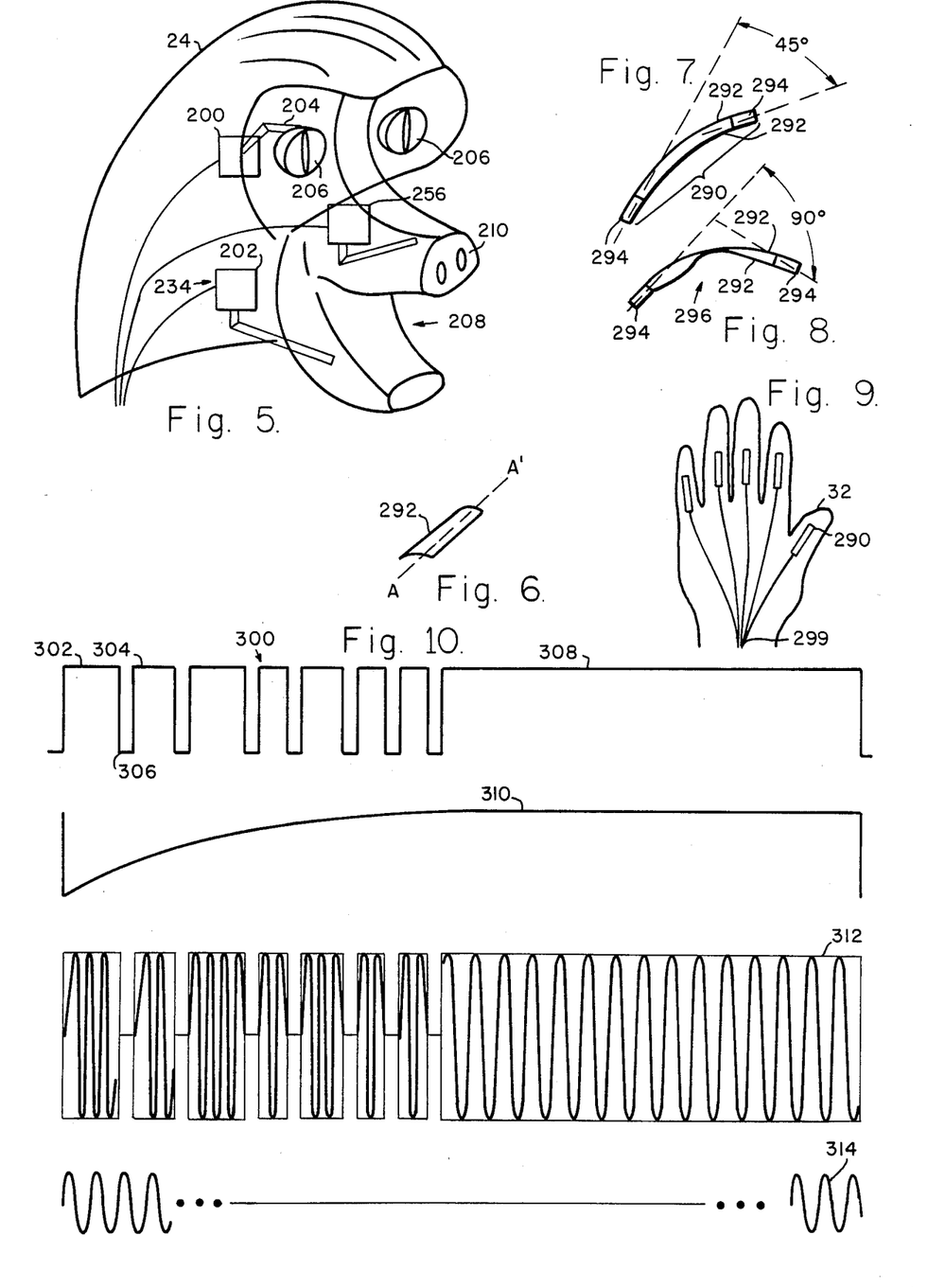
FIG. 5 is a detail of the head of an animated costume, showing three of a plurality of servo motors and mechanical linkages connecting the motors with external features of the costume.
FIG. 6 is a detail of bent tinned spring material used as a raw material for one finger switch of a switch glove assembly.
FIG. 7 is a side elevation view of a completed finger switch assembly, showing a 45 degree switch in its unbent shape.
FIG. 8 is a side elevation view of a finger switch assembly, showing the plates of the switch making contact by being bent 90 degrees or by pressure being applied at the center of the switch.
FIG. 9 is a detail of a switch glove assembly, showing five finger switch assemblies sewn into a glove.
FIG. 10 is a representation of a "pulse chain" which might be found at points in the circuitry of either the multichannel transmitter or the costume's control box, and several other waveforms associated with the pulse chain.

The output of the PWM 138 is a "pulse chain" 300 which consists of all of the seven pulses corresponding to the seven input signals, seen in FIG. 10. The pulse 302 corresponding to the amplitude of input channel one of the multichannel transmitter 24 is put first in the pulse chain. The pulse 304 corresponding to input channel two is arranged second in the pulse chain, and so forth for the seven pulses. Each pulse is separated by a low level 302 lasting for a fixed period of time, for example, 300 micro-seconds. The seven pulses corresponding to the input signal amplitudes for channels one through seven are followed by a much longer pulse 308 called the sync pulse. The sync pulse 308 is at least four times longer than the longest of the channel one through seven pulses. The entire pulse chain 300, consisting of the channel one through seven pulses 302, 304, etc., plus the sync pulse 308, occurs during one frame cycle. The time for one frame cycle, known as the frame time, is fixed by potentiometer 144 on the PWM. The frame time is typically set to approximately 25 milliseconds, which allows the position of each character's mouth to be changed forty times per second.

As shown in FIG. 3, two output signals are fed from the PWM 138 to the output monitor jacks 146, 148. One output signal 148 is the pulse chain, and is called SERDAT. The other output signal 146 is a triangle wave 310 shown in FIG. 10. Triangle wave 310 is called FRAME and is used to synchronize the horizontal sweep of an oscilloscope with the SERDAT 148.

Referring again to FIG. 3, the output 148 of the PWM 138 is brought by conductor 150 to the radio frequency modulator (RFM) 152. The RFM takes the pulse chain output 148 of the PWM 138 and modulates a radio frequency carrier using any common modulation scheme. In the preferred embodiment, AM is used, but FM or PCM may also be used. As one versed in the art will appreciate, the output 148 of the PWM 138 could just as easily be fed to a light transmission device, or an ultrasonic transmitter or other transmission/reception link instead of an AM radio link. The AM output of the RFM 152 is shown as waveform 312 in FIG. 10. Waveform 314 is of the unmodulated RF carrier before modulation with the output 148 of the PWM 138.

From the output of the RFM 152, a coaxial transmission line 154 of a type commonly known carries the AM radio signal to a low pass filter (LPF) 156. The LPF is of an conventional design and is used to reduce spurious outputs and interference to surrounding electronic equipment. The output of the LPF 156 is brought to an SWR bridge 158 of common design. The SWR bridge allows the transmitter operator to check that the antenna 22 is functioning properly. An antenna tuner 160 is located physically very close to the antenna 22 and is adjusted to minimize reflected power as measured on the SWR bridge 158.

The RF power output on conductor 162 from the RFM 152 is transmitted by antenna 22 to the area where the costumes are located.

Costume

The costume 12 of this invention includes both electrical and mechanical components. The mechanical components include the body of the costume, a vest which houses the electronic control box 28 and rechargeable battery pack 36, and the sculpted head 24. It is the head 24 which houses the servo motors 200, 202, mechanical linkages 204, 205 and moving external costume parts 206, 208 which are responsible for the realistic appearance of the characters.

The costume body 12 of this invention is large enough for a person to fit inside, and is light enough to allow complete freedom of motion of legs, torso, arms, neck, and head. The person inside the suit is typically a dancer who lends animation to the character by virtue of the dancer's own movements. The construction of the costume body is of a type commonly known to those skilled in the art. Successive layers of high density foam form the understructure and are covered by fur, hair, clothes, or paint. The dancer inside the costume 12 wears a vest which contains the control box 28, described below, and the rechargeable battery pavk 36. The battery pack 36 is preferably of a quick charge nickel-cadmium type, again well-known to those skilled in the art.

The head 24 of the costume 12 has an aluminum structure on which molded fiberglass panels are mounted. Some of the fiberglass panels do not move, but give shape to the costume exterior. Other sections, made of fiberglass or lightweight plastic, are under control of electrical servo motors 200, 202. These sections move in response to commands from the dancer's switch glove assemblies 32 or in response to the transmitted pulse chain 312 which directly controls mouth position and may control nose position also, as described below. The moving fiberglass or plastic sections give the costume the appearance of life-like responses to the action that the character is performing. For example, two servo motors 200 may be connected to a pair of plastic hemispheres. On the exterior of the plastic hemispheres may be painted a pair of eyes. If one servo moves the eyes from side to side, and the other servo moves the eyes up and down, the eyes are now able to move in all directions. The dancer, who controls all changeable facial features except the mouth, may then point the eyes of the character to the left when his head moves left, or he may point the eyes down when picking up an object. The external features to which servo motors 200, 202 are connected include, but are not limited to, the eyes, eyelids, eyebrows, nose, ears, and mouth. While only two servo motors 200, 202, and three external features 206 (eyes), 208 (mouth), 210 (nose) are shown in FIG. 5, it will be appreciated that many more external features, moved by many more servo motors, may exist in a given sculpted head 24.

Control Box

The control box 28 in the costume 12 contains the following components: a radio antenna 30, a radio receiver 220, mouth demultiplexer 222, a plurality of servo drivers 224, a plurality of pulse width comparators 226, and low battery detection circuitry 228.

The function of the radio antenna 30 is to receive the radio frequency signals sent to the costume by the multichannel transmitter 20. The antenna itself is a piece of wire one-eighth wavelength long. With a 72 MHz carrier frequency, one-eighth wavelength is approximately 18 inches. The antenna 30 is tuned to resonance at 72 MHz by the input circuitry in the radio receiver 220. The antenna 30 is worn inside the costume.

The purpose of the radio receiver 220 is to take the radio signal picked up by the antenna 30 and to convert it from a radio signal to conventional CMOS logic levels. The pulse chain 300 originally found in the multichannel transmitter 20 is recreated at the output 230 of the radio receiver 220. As noted above, the pulse chain may be transmitted to the costume using an AM, FM or PCM radio link, or by optical, ultrasound, or other means. In the preferred embodiment, AM radio transmission is used. Obviously, therefore, an AM radio receiver 220 is essential in such a case.

The purpose of the mouth demultiplexer 222 is to take the pulse chain 300 from the output 230 of the radio receiver 220 and recover only the one pulse that corresponds to a particular character. The mouth demultiplexer 222 does this by inputting the pulse chain 300 to a commonly available CMOS logic chip, for example, the MC14017 decade counter. This chip is configured so that each pulse in the pulse chain 300 is output to a different pin of the chip. By connecting the mouth output conductor 232 to the appropriate pin, a control box is assigned to a specific character. The sync pulse 308 of the pulse chain 300 resets the mouth demultiplexer 222 once per frame so that the first mouth pulse is always recognized as the first pulse.

The mouth output conductor 232 may be connected directly to the mouth servo input 234 or may optionally be connected through a pulse width comparator circuit 226.

The pulse width comparator circuit 226 comprises a timer 236, pulse generator 238, and finger switch assembly 240. The pulse width comparator circuit is used when the mouth servo input 234 is to be connected to a signal other than the output 232 of the mouth demultiplexer 222. This may occur when a dancer requires the ability to open the mouth 208 of the costume so as to see marks on the floor or to pick up props.

The pulse width comparator 226 selects either the output 232 of the mouth demultiplexer 222 or a pulse whose duration is determined by pulse generator 238. A typical implementation would be to have the output of the pulse generator 238 be a pulse whose width, when applied to the mouth servo input 234, causes the mouth 208 to be fully opened. The width of the pulse output by the pulse generator 238 is controlled by the potentiometer 242.

A timer 236 within the pulse width comparator measures the width of the pulse at the output 232 of the mouth demultiplexer 222. In particular, the timer measures output 232 against a reference pulse width set by potentiometer 244 and pulse generation circuitry contained in the timer 236. If the width of pulse output 232 is less than the preset value in the timer 236, the pulse width comparator knows that the mouth is being requested to open by the multichannel transmitter 20. In this case, the pulse width comparator 226 connects the output 232 to the mouth servo input 234 by solid state switch 246, so that the character's mouth will move according to the commands being broadcast by the multichannel transmitter 20.

If the timer 236 determines that the output 232 of the mouth demultiplexer 222 is longer than the reference pulse width set by potentiometer 244, then the pulse width comparator 226 knows that the mouth is in its fully closed position and is not being requested to open by the multichannel transmitter 20. If this is the case, the pulse width comparator 226 checks finger switch assembly 240. The dancer inside the costume is trained to close the finger switch assembly 240 by bending a finger if it is desired to open the character's mouth. If the finger switch assembly 240 is closed, the pulse width comparator 226 switches solid state switch 246 so that the pulse generator 238 has its output connected to the mouth servo input 234. The output 248 is a pulse whose width causes the mouth 208 to be fully open. Therefore, in the absence of a conflicting command from the multichannel transmitter 20, the dancer inside the costume is able to open the character's mouth.

A second pulse width comparator 250 is used to control the nose 210 of a character. If the mouth 208 movement is to be exaggerated and made more noticeable to a camera or audience, it may be desirable to have the character's nose 210 move in opposition to the mouth 208. Therefore, if the nose raises up when the jaw is lowering, the appearance of mouth motion will be greater.

The second pulse width comparator 250, including a timer 252, also monitors the output 232 of the mouth demultiplexer 222. The timer 252 may be adjusted by potentiometer 251 to any pulse length. When the output 232 of the mouth demultiplexer 222 is shorter than the pulse set by the potentiometer 251, as occurs when the mouth 208 is given a command to open more than halfway, this pulse width comparator 250 switches the state of solid state switch 254. The nose servo input 256 is connected to the output of a pulse generator 258 whose output, determined by potentiometer 260, corresponds to the pulse width required for the nose servo to be in a fully up position. If the pulse width comparator 250 determines that the output 232 of the mouth demultiplexer is longer than the reference pulse set by the potentiometer 251, as occurs when mouth is less than halfway open, then the position of the nose is controlled by a finger switch assembly 262. The finger switch assembly 262 is connected to a servo driver 224, as described more fully below, and selects one of two potentiometers 263, 265 corresponding to nose up and nose down positions for input 281 from an analog multiplexer 268a to pulse width modulator 278. In summary, the function of pulse width comparator 250 is to control the position of the nose as a function of both the mouth demultiplexer output 232 and finger switch assembly 262.

The control box 28 also contains a plurality of servo drivers 224. The purpose of a servo driver, which comprises an analog multiplexer 268, potentiometers 270, 272, 274, 276, pulse width modulator 278 and servo drive demultiplexer 282, is to take the output of one or more finger switch assemblies 264, 266, and output a pulse width to one of the servos in the costume head. The analog multiplexer 268 has plurality of potentiometers 270, 272, 274, 276 connected to its inputs. Each potentiometer 270, 272, 274, 276 outputs a different voltage. The condition of finger switch assemblies 264, 266 determines which potentiometer 270, 272, 274, 276 has its output switched by the analog multiplexer 268 to the pulse width modulator 278 via input 280. The four potentiometers 270, 272, 274, 276 would be set so that their voltage, when selected for the pulse width modulator 278, causes the particular servo to assume a different position. For example, potentiometer 270 might cause the pulse width modulator 278 to output a pulse causing the eyes 206 to look full left. Closing finger switch assembly 264 might cause analog multiplexer 268 to connect potentiometer 272 to the pulse width modulator 278 via input 280. The output of the pulse width modulator 278 might then be a pulse whose width causes the eyes 206 to assume a fully right position. Therefore, the setting of potentiometer 270, 272, 274, 276 each select a distinct servo position for a given servo.

For clarity, only one servo driver 224 and part of another 224a has been shown. In the preferred configuration, up to six such servo drivers may be found in one control box. The pulse width modulator 278 is able to accept up to seven inputs, of which inputs 280 and 281, described above, are two. The output of pulse width modulator 268 is a pulse chain similar to pulse chain 300 as described in the section concerning multichannel transmitter 20. The servo driver demultiplexer 282 splits the pulse train into its component pulses and outputs each pulse on a separate conductor to a servo input 200.

The control box also contains circuitry 228 which compares the battery voltage to a known voltage reference. When the battery voltage falls below the voltage set by the voltage reference, the light emitting diode (LED) 284 goes out. This allows the battery to be changed before it goes completely dead.

Switch Glove Assemblies

The dancer must control the position of all the servos 200 except the mouth servo 202, the position of which is controlled by the multichannel transmitter 20, as described above. Finger switches 290 (FIG. 7) which do not interfere with the dancer's ability to use hands have been developed as a part of this invention. The switches 290 are affixed to gloves worn by the dancer to form switch glove assembly 32. In the preferred embodiment, as many as ten switches, one per finger, may be used.

The switches themselves, referred to as finger switch assemblies 290, are made from two pieces of spring steel 292 and two pieces of insulation 294, such as fiberglass printed circuit material. The spring steel 292 is originally in the form of long strips, about three inches long and one-half inch wide. Each strip is bent along its long axis (along line A-A' in FIG. 6) so that it will spring back to a straight shape after being bent. Two strips of spring steel 292 are cut as long as the particular dancer's finger where they will be used. Then a fiberglass spacer 294, such as that made of printed circuit material, is soldered between one end of each spring steel strip 290. The entire assembly is bent as shown in FIG. 7 and the second fiberglass spacer 294 is soldered into place at the far end of the two spring steel strips 292. The result is the completed finger switch assembly 290 shown in FIG. 7. The switch is normally bent as much as it was bent during assembly. In the case of FIG. 7, the normal bend is 45 degrees.

When the switch 290 is bent beyond 45 degrees, or when pressed in the center 296, the two switch plates make contact, closing the switch 290. The dancer need only bend a finger to make the switch close. Pressure from another finger in the center 296 of the switch assembly 290 will also cause switch closure. The finger switch assemblies 290 are sewn into gloves to form a switch glove assembly 32. The finger switch assemblies 290 are connected to the control box 28 by small diameter flexible conductors 299.

Thus, a walk-around costume apparatus comprising a costume and a programming/playback system has been disclosed. Various modifications and changes will make themselves available to those of ordinary skill in the art, and all such modifications and changes not deviating from the spirit and scope of the invention are intended to be covered by the appended claims.

What is claimed is:

1. A full-size walk-around costume apparatus comprising a costume, including a movable mouth, and a programming/playback system for controlling the movements of said mouth of said costume in synchrony with a prerecorded audio track, said programming/playback system including means for generating a tone, means for controlling the amplitude of said tone, means for converting said tone into a series of pulses to form a pulse chain which corresponds to said amplitude of said tone, means for modulating a carrier signal with said pulse chain and means for transmitting said modulated pulse chain, said costume further including means for receiving said modulated pulse chain, means for converting said modulated pulse chain into an electrical pulse, and means for controlling the position of said mouth with said electrical pulse.

2. The apparatus of claim 1 wherein said programming/playback system further includes means for controlling the mouth of each of several of said costumes simultaneously, with each pulse in said pulse chain selectively adapted to control each of said mouths of said costumes and wherein each costume includes means for selecting each said pulse from said pulse chain for controlling the movements of said mouth.

3. The apparatus of claim 1 comprising:
   (a) at least one joystick including a potentiometer for controlling said amplitude of said tone;

(b) a multichannel programming tone generator including a tone generator for generating a tone signal of a predetermined frequency, the amplitude of which is varied by said joystick, said amplitude being associated with the position of said mouth of said costume;

(c) a multitrack tape recording including:
  (1) switch means for selecting programming input from said multichannel programming tone generator or playback output to a multichannel transmitter, and
  (2) record/play tape storage means for recording/playing tone signals generated by said multichannel programming tone generator; and (d) said multichannel transmitter including:
  (1) a pulse width modulator for converting said tone signal into a pulse whose width is linearly proportional to said amplitude of said tone signal,
  (2) modulation means for modulating said pulse, and
  (3) an antenna for transmitting said modulated pulse.

4. The apparatus of claim 3 wherein said modulations means comprises AM.

5. The apparatus of claim 4 wherein said multichannel transmitter further includes:
  (a) a filter for reducing spurious outputs and interferences from said modulated pulse;
  (b) a bridge for determining proper operation of said antenna; and
  (c) an antenna tuner for minimizing reflected power as measured on said bridge.

6. The apparatus of claim 3 wherein said multichannel transmitter further includes:
  (a) a preamplifier section with variable gain for compensating for any fluctuation in said tone signal input from said multitrack tape recorder;
  (b) a fixed input signal generator for providing at least one input signal of a predetermined amplitude and switch means for selecting between said tone signal input and said at least one input signal; and
  (c) means for displaying the level of said tone signal prior to conversion into said pulse.

7. The apparatus of claim 1 wherein said costume further include a sculpted head and face and means for moving parts of said head and said face.

8. The apparatus of claim 7 wherein said costume further includes actuators and linkages adapted to move said parts of said head and said face in response to an input pulse, a control mechanism for controlling said actuators and a power supply for providing power to said control mechanism and said actuators.

9. The apparatus of claim 9 wherein said parts include said mouth, a nose, a pair of eyes, eyebrows, eyelids and ears.

10. The apparatus of claim 9 wherein said control mechanism includes:

(a) an antenna for receiving said modulated pulse;
(b) a receiver for converting said modulated pulse to said pulse chain;
(c) means for recovering a pulse from said pulse chain which is intended for controlling said mouth of said character;
(d) finger switch means associated with said costume for selecting a separately generated pulse for controlling said mouth of character; and
(e) means for detecting the position of said mouth of said costume, comparing the width of a pulse, determining whether said pulse from said programming/playback system or from said finger switch means should be input to an actuator associated with said mouth, whereby said mouth of said costume is controlled by said finger switch means in reference to a pulse transmitted from said programming/playback system.

11. The apparatus of claim 9 further including:
(a) finger switch means for generating a pulse for separately controlling said nose of said costume; and and
(b) means for determining the position of said mouth of said costume, for switching control to said finger switch means depending on said mouth position and for inputting a pulse to an actuator associated with said nose.

12. The apparatus of claim 9 further including:
(a) a plurality of finger switch means for generating a pulse for individually controlling each of said parts; and
(b) means for sensing the presence of said pulse and inputting said pulse to an actuator associated with a part of said costume.

13. The apparatus of claim 10 wherein said finger switch means comprises two pieces of elongated spring steel, separated by two pieces of insulated material at either end, said pieces of spring steel capable of making shorting contact in the central region of said finger switch means.

14. Finger switch means for making shorting contact comprising two pieces of elongated spring steel, separated by two pieces of insulating material at either end, said pieces of steel capable of making said shorting contact in the central region of said finger switch means.

15. The finger switch means of claim 14 wherein said insulated material comprises fiberglass spacer.

16. A switching glove assembly comprising a glove and containing at least one finger switch means, said finger switch means comprising two pieces of elongated spring steel, separated by two pieces of insulated material at either end, said pieces of steel capable of making shorting contact in the central region of said finger switch means.

17. The assembly of claim 16 comprising a plurality of finger switch means.

* * * * *